(12) United States Patent
Prins et al.

(10) Patent No.: US 11,119,719 B2
(45) Date of Patent: Sep. 14, 2021

(54) SCREEN SHARING FOR DISPLAY IN VR

(71) Applicants: Koninklijke KPN N.V., Rotterdam (NL); Nederlandse Organisatie Voor Toegepast-Natuurwetenschappelijk Onderzoek TNO, s-Gravenhage (NL)

(72) Inventors: Martin Prins, The Hague (NL); Emmanuel Thomas, Delft (NL); Hans Maarten Stokking, Wateringen (NL); Hendrikus Nathaniël Hindriks, The Hague (NL)

(73) Assignees: KONINKLIKE KPN N.V., Rotterdam (NL); NEDERLANDSE ORGANISATIE VOOR TOEGEPAST-NATUURWETENSCHAPPELIJK ONDERZOEK TNO, 'S-Gravenhage (NL)

(*) Notice: Subject to any disclaimer, the term of this patent is extended or adjusted under 35 U.S.C. 154(b) by 0 days.

(21) Appl. No.: 16/624,255

(22) PCT Filed: Jun. 29, 2018

(86) PCT No.: PCT/EP2018/067594
§ 371 (c)(1),
(2) Date: Dec. 18, 2019

(87) PCT Pub. No.: WO2019/002559
PCT Pub. Date: Jan. 3, 2019

(65) Prior Publication Data
US 2020/0401362 A1    Dec. 24, 2020

(30) Foreign Application Priority Data
Jun. 29, 2017 (EP) .................... 17178740

(51) Int. Cl.
*G06F 3/14*     (2006.01)
*G06F 3/0481*   (2013.01)
*G06T 3/40*     (2006.01)

(52) U.S. Cl.
CPC ........ *G06F 3/1454* (2013.01); *G06F 3/04815* (2013.01); *G06T 3/4092* (2013.01)

(58) Field of Classification Search
CPC ..... G06F 3/1454; G06T 3/4092; G09G 5/005; G09G 2320/0261; G09G 2320/08; G09G 2340/04; G09G 2370/042
See application file for complete search history.

(56) References Cited

U.S. PATENT DOCUMENTS

| | | | |
|---|---|---|---|
| 2003/0020748 | A1 | 1/2003 | Charpentier |
| 2012/0017172 | A1* | 1/2012 | Sheth .................... G06F 9/451 715/800 |
| 2013/0147836 | A1 | 6/2013 | Small et al. |
| 2015/0007224 | A1* | 1/2015 | Cazoulat ........ H04N 21/42204 725/37 |
| 2015/0378157 | A1* | 12/2015 | Kuehne ................ G06F 3/012 345/8 |

FOREIGN PATENT DOCUMENTS

EP     1 555 634 A1    7/2005

OTHER PUBLICATIONS

Smith, John R., "MPEG-21 Digital Item Adaptation: Enabling Universal Multimedia Access," IEEE Computer Society, (Jan.-Mar. 2004).
Chang, Shif-Fu, et al., "Video Adaptation: Concepts, Technologies and Open Issues," Mitsubishi Electric Research Laboratories (2005).
Reddy, M., "Specification and Evaluation of Level of Derail Selection Criteria," Virtual Reality, 3:132-143 (1998).

(Continued)

*Primary Examiner* — Nelson M Rosario
(74) *Attorney, Agent, or Firm* — Hamilton, Brook, Smith & Reynolds, P.C.

(57) ABSTRACT

Systems and methods for screen sharing are provided. The screen sharing may comprise providing image data from a sender system to a receiver system. The receiver system may be a Virtual Reality [VR] system configured to render the image data in a virtual environment by projecting the image data onto a virtual canvas. At the sender system, visual (Continued)

content may be identified to share with the receiver system. The rendering or display of the virtual environment by the receiver may impose legibility constraints on the visual content. An adjusted version of the visual content may be generated which provides improved legibility when viewed in the virtual environment. The image data representing the adjusted version may then be provided to the receiver system. Accordingly, the legibility of the visual content shared by the sender system may be improved when rendered, displayed and subsequently viewed by a user in the virtual environment.

12 Claims, 9 Drawing Sheets

(56) References Cited

OTHER PUBLICATIONS

Jankowski, J., et al., "Integrating Text with Video and 3D Graphics: The Effects of Text Drawing Styles on Text Readability," Interaction Techniques, (Apr. 2010).
X3D Example Archives: VRML 2 Sourcebook, Chapter 25—Level of Detail, retrieved: http://www.web3d.org/x3d/content/examples/Vrml2.0Sourcebook/Chapter25-LevelOfDetail/ (No Date Given).
International Search Report for PCT/EP2018/067594, entitled: Screen Sharing for Display in VR, dated Jul. 25, 2018.
European Search Report for 17178740.1, entitled: Screen Sharing for Display in VR, dated Nov. 28, 2017.

* cited by examiner

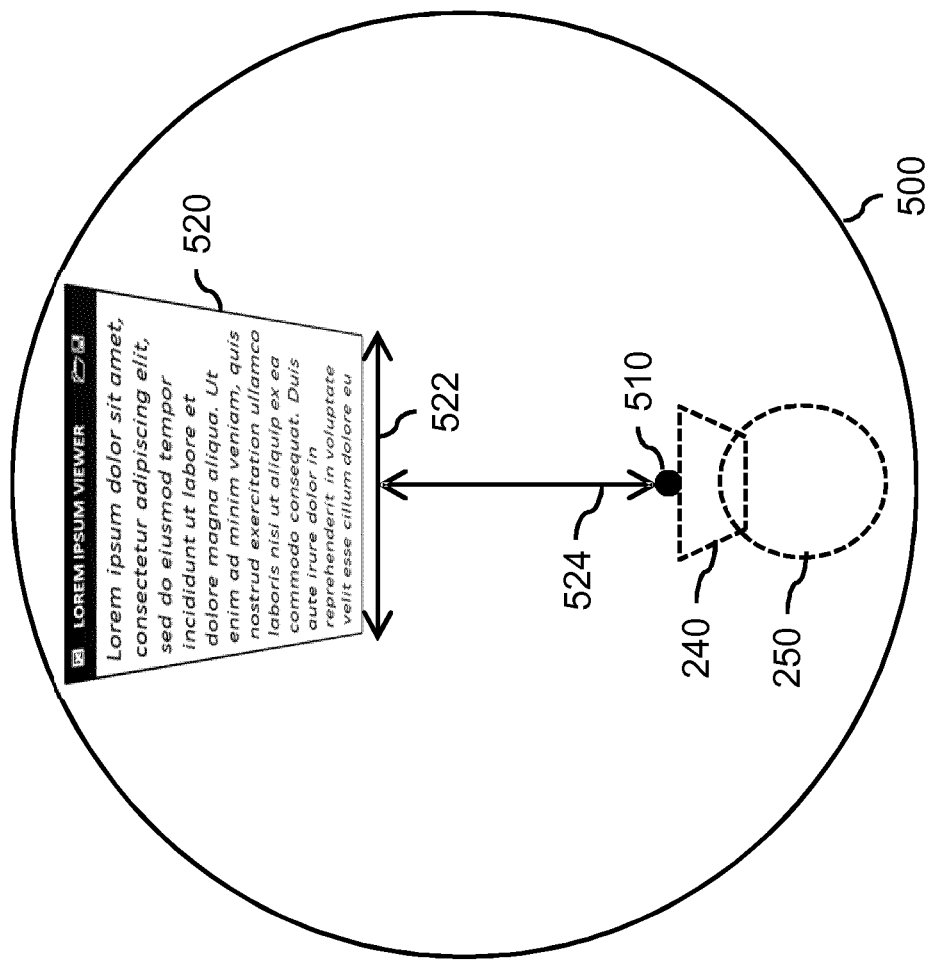

SCREEN SHARING FOR DISPLAY IN VR

This application is the U.S. National Stage of International Application No. PCT/EP2018/067594, filed Jun. 29, 2018, which designates the U.S., published in English, and claims priority under 35 U.S.C. § 119 or 365(c) to European Application No. 17178740.1, filed Jun. 29, 2017. The entire teachings of the above applications are incorporated herein by reference.

FIELD OF THE INVENTION

The invention relates to a method and sender system for screen sharing by providing image data to a receiver system. The invention further relates to a method and receiver system for rendering the image data in a virtual reality environment. The receiver system may be a virtual reality system. The invention further relates to metadata for use in the screen sharing, and to a computer program comprising instructions for a processor system for performing either of said methods.

BACKGROUND ART

Screen sharing is a known technique to share visual content from a sender device with a receiver device. For example, on personal computers and mobile devices, a software application 'Skype' allows screen sharing between a sender and one or more receivers. Here, the term 'screen sharing' is understood as including the sharing of an entire screen which is displayed by the sender device, e.g., 'full screen sharing', but also parts thereof such as a specific window of an application. In general, screen sharing may involve sharing visual content which is currently displayed by the sender device, or which is intended for display, with a receiver device.

In many cases, the visual content shared with the receiver device is sufficiently legible to a user when displayed by the receiver device. A reason for this may be that the sender device and receiver device may share similar display characteristics, e.g., by using a similar display size and display resolution.

The inventors have considered the following scenario, in which visual content is shared by a sender system with a receiver system, with the latter being a Virtual Reality (VR) rendering system which is configured to show the visual content in a virtual environment by projecting image data of the visual content onto a virtual canvas. Typically, VR rendering systems, which are in the following also simply referred to as VR systems, make use of Head Mounted Displays (HMD) to render the virtual environment to the user, although other types of VR displays and rendering techniques may be used as well, including but not limited to, augmented reality, holography and Cave automatic virtual environments (recursive acronym CAVE).

It is known to display image data from external sources in such a virtual environment, e.g., by projecting the image data onto a virtual screen or another type of virtual canvas in the virtual environment. Here, the term 'projecting' refers to any steps involved in achieving that the image data is shown on the virtual canvas in the virtual environment. For example, a texture mapping technique may be used, such as UV mapping, which involves projecting a 2D image to a 3D model's surface.

The inventors have recognized that the rendering or display of a virtual environment imposes constraints on the legibility of visual content which is shown in the virtual environment. A non-limiting example is that the relatively limited physical resolution of an HMD may be used to display a relatively wide field-of-view. As such, the area of the HMD in which a virtual screen is shown to a user may have much fewer physical pixels available to display visual content thereon since it may allocate only a relatively small part of its physical pixels to display the virtual screen. In contrast, on a computer monitor or other type of non-VR display, the visual content may be shown in an area which is larger in relation to the overall display area. As a result, text of a certain font size may be readable on the non-VR display, but not readable on the virtual display, e.g., due to there being insufficient physical pixels to show the text adequately. Another non-limiting example of a legibility constraint is that the virtual screen may be too small, too far away or at an angle from the viewer in the virtual environment which makes the visual content insufficiently legible irrespective of the HMD's resolution.

SUMMARY OF THE INVENTION

It would be advantageous to obtain screen sharing between a sender system and a VR-based receiver system which provides improved legibility.

In accordance with a first aspect of the invention, a method may provide image data from a sender system to a receiver system for screen sharing. The receiver system may be a Virtual Reality [VR] system configured to render the image data in a virtual environment by projecting the image data onto a virtual canvas.

The method may comprise, at the sender system:
identifying visual content to be shared with the receiver system;
generating an adjusted version of the visual content which provides improved legibility when viewed in the virtual environment by adjusting a presentation of the visual content based on receiver metadata which is indicative of legibility constraints imposed by the rendering or display of the virtual environment; and
providing image data representing the adjusted version of the visual content to the receiver system.

In accordance with a further aspect of the invention, a sender system may be configured for providing image data to a receiver system for screen sharing. The receiver system may be a Virtual Reality [VR] system configured to render the image data in a virtual environment by projecting the image data onto a virtual canvas.

The sender system may comprise:
a network interface to a network;
a processor configured to:
identify visual content to be shared with the receiver system;
generate an adjusted version of the visual content which provides improved legibility when viewed in the virtual environment by adjusting a presentation of the visual content based on receiver metadata which is indicative of legibility constraints imposed by the rendering or display of the virtual environment; and
using the network interface, provide image data representing the adjusted version of the visual content via the network to the receiver system.

In accordance with a further aspect of the invention, a method may render image data provided by a sender system to a receiver system for screen sharing. The receiver system may be a Virtual Reality [VR] system.

The method may comprise, at the receiver system:
obtaining, from the sender system:
image data representing visual content to be shared by the sender system with the receiver system, and
render metadata which indicates at least in part how the image data is to be rendered in a virtual environment and which is generated based on legibility constraints imposed by the rendering or display of the virtual environment; and
rendering the image data in the virtual environment based on the render metadata, wherein said rendering comprises projecting the image data onto a virtual canvas in the virtual environment.

In accordance with a further aspect of the invention, a receiver system may be configured for rendering image data provided by a sender system to the receiver system for screen sharing. The receiver system may be a Virtual Reality [VR] system.

The receiver system may comprise:
a network interface to a network for obtaining, from the sender system:
image data representing visual content to be shared by the sender system with the receiver system, and
render metadata which indicates at least in part how the image data is to be rendered in a virtual environment and which is generated based on legibility constraints imposed by the rendering or display of the virtual environment; and
a processor configured to render the image data in the virtual environment based on the render metadata, wherein said rendering comprises projecting the image data onto a virtual canvas in the virtual environment.

In accordance with the above measures, a sender system may be provided which shares image data with a receiver system. The receiver system may be a VR device, while the sender system may, in many embodiments, be a non-VR device. A specific yet non-limiting example may be that the sender system may be a device which comprises or is connected to a stationary or handheld display, whereas the receiver system may be a device which comprises or is connected to a head mounted display. The devices may be connected via one or more networks, such as the Internet.

At the sender system, visual content may be identified which is to be shared with the receiver system. Such visual content may include text, tables, vector graphics, raster graphics, etc., or a combination thereof. Such visual content may comprise letters, figures, symbols etc. In addition, the visual content may be two-dimensional but also three-dimensional content, such as stereographic content represented by pairs of left and right images, image+disparity data, etc., or three-dimensional content represented by computer graphics, e.g., a textured 3D mesh. In general, the visual content may already be formatted for display, in which case it may also be referred to 'screen content' or 'screen share', but may also omit such formatting. A specific example of the latter may be ASCII-standard text which is not yet rasterized for display.

Having identified the visual content, an adjusted version of the visual content may be generated, which may then be shared with the receiver system instead of, or may be in addition to, the original version of the visual content. Such sharing may be in the form of image data. For example, the image data may be obtained by formatting the adjusted version of the visual content for display, which in the earlier-mentioned example may involve rasterizing the adjusted version of the text. The adjusted version may be based on the original visual content, or on source content on which the original visual content is based, such as a Microsoft Word or Microsoft PowerPoint file, a web page, etc. The adjustment may be performed by the sender system to improve the legibility of the visual content when rendered, displayed and viewed by a user of the receiver system in the virtual environment. In particular, the adjustment may preserve the substance of the visual content, e.g., the information it represents, while altering its presentation for viewing in the virtual environment. In the earlier-mentioned example, this may involve increasing a font size of the text.

The adjustment may be performed based on receiver metadata which is indicative of constraints imposed by the rendering or display of the virtual environment on the legibility of the visual content. Such receiver metadata may take various forms, as exemplified by the various embodiments described in this specification.

By sharing an adjusted version of the visual content with the receiver system, the legibility of the visual content may be improved when rendered, displayed and subsequently viewed by a user in the virtual environment. This may have as advantage that the user may (easier) comprehend the information represented by the visual content, which in turn may facilitate information sharing, collaboration between remote users, etc. It may also be avoided that a user may have to leave the virtual environment in order to view the visual content on a separate display.

In an embodiment, the method performed at the sender system may further comprise, and/or the processor of the sender system may be further configured to:
based on the legibility constraints indicated by the receiver metadata, generating render metadata which indicates at least in part how the image data is to be rendered in the virtual environment, and
providing the render metadata to the receiver system.

The render metadata may be provided to the receiver system via a network interface of the sender system. In this embodiment, the sender system may suggest or prescribe the receiver system how the image data is to be rendered in the virtual environment. For that purpose, the sender system may generate metadata which is associated with the image data and provide the render metadata to the receiver system. In a specific example, the render metadata may be provided together with the image data to the receiver system, e.g., multiplexed in a same media stream.

By providing such render metadata, it may be avoided that the receiver system renders the image data in such a way that legibility is (severely) impaired. For example, the render metadata may indicate at least one of:
a size of the virtual canvas in the virtual environment; and
a distance and/or orientation of the virtual canvas with respect to a viewpoint of a viewer in the virtual environment.

The size of the virtual canvas may be a minimum size or a recommended size, e.g., for sufficient or optimum legibility of the visual content. Similarly, the distance of the virtual canvas to the viewpoint of the viewer may be a maximum distance or a recommended distance, e.g., for sufficient or optimum legibility of the visual content. The orientation may be a maximum rotation and/or tilt with respect to the viewpoint of the viewer, or a fixed or recommended orientation. Such orientation may skew the view and may put further constraints on legibility.

In an embodiment, the method performed at the receiver system may further comprise, and/or the receiver system may be further configured to:

providing receiver metadata to the sender system, wherein the receiver metadata is indicative of the legibility constraints imposed by the rendering or display of the virtual environment.

In a related embodiment, the method performed at the sender system may further comprise, and/or the sender system may be further configured to:

obtaining the receiver metadata from the receiver system, wherein the receiver metadata indicates one or more characteristics of the rendering or display of the virtual environment by the receiver system.

The receiver system may indicate one or more characteristics of the rendering or display of the virtual environment to the sender system which may affect the legibility of the visual content when viewed in the VR environment. Such characteristics may include, but are not limited to:

- a type of display on which the VR environment is displayed;
- a resolution of the display;
- a field of view of the display;
- a type of lens used by the display;
- a color space used by the display;
- a size of the virtual canvas in the VR environment; and
- a distance and/or orientation of the virtual canvas with respect to a viewpoint of a viewer in the VR environment.

These and similar characteristics may indicate how the legibility of the visual content may be affected by the rendering and the display of the virtual environment, and may allow the presentation of the visual content to be adjusted to overcome, or at least to compensate for, such legibility constraints. A specific yet non-limiting example is that the size of the virtual canvas in the VR environment may be fixed and relatively small. Accordingly, the presentation of the visual content may be adjusted to ensure legibility despite the relatively small size of the virtual canvas. In another example, a maximum size of the virtual canvas that may be made available, and/or a minimum distance that may apply in the VR environment, may be indicated. An advantage of this embodiment may be that the presentation of the visual content may be adjusted specifically for the legibility constraints imposed by a particular (type of) receiver system, rather than, e.g., for a generic or average receiver system.

In an embodiment, the adjusting of the presentation of the visual content may comprise at least one of:

- adjusting a font size of text in the visual content;
- adjusting a zoom level in the presentation of the visual content;
- adjusting a color scheme in the presentation of the visual content;
- adjusting a contrast of at least part of the visual content; and
- re-formatting the visual content for a display having a different pixels-per-inch setting and/or size than the display for which the visual content was formatted.

In an embodiment, generating the adjusted version of the visual content may comprise:

adjusting a current presentation of the visual content which is currently displayed by the sender system on a display; or generating the adjusted version of the visual content separately from the current presentation of the visual content.

In accordance with a further aspect of the invention, a transitory or non-transitory computer-readable medium may be provided which may comprise a computer program. The computer program may comprise instructions for causing a processor system to perform any of the abovementioned methods.

In accordance with a further aspect of the invention, a transitory or non-transitory computer-readable medium may be provided which may comprise:

receiver metadata which is indicative of legibility constraints imposed by a rendering or display of a virtual environment on the legibility of image data which is rendered in the virtual environment; or render metadata which indicates at least in part how the image data is to be rendered in the virtual environment.

It will be appreciated by those skilled in the art that two or more of the abovementioned embodiments, implementations, and/or aspects of the invention may be combined in any way deemed useful.

Modifications and variations of any of the systems, methods, computer programs or metadata, which correspond to the described modifications and variations of another system, method, computer program or metadata, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

FIG. 7 illustrates the rendering of visual content on a virtual canvas in a virtual environment in relation to a viewpoint of a viewer;

Figure 1:
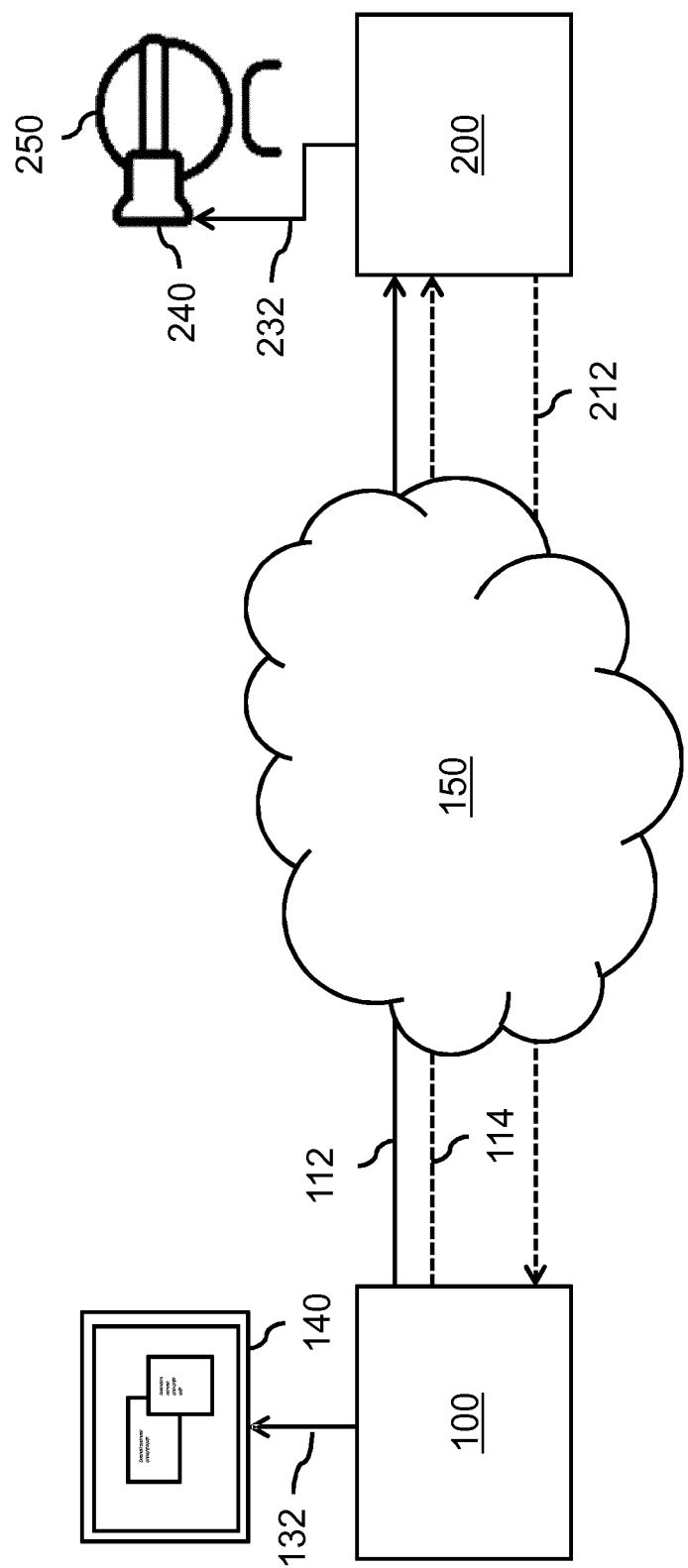
FIG. 1 shows a sender system sending image data to a VR-based receiver system for screen sharing, with the image data being sent via a network.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

100 sender system
110 network interface
112 image data
114 render metadata
120 processor
130 display output
132 display data
140 display
150 network
200 receiver system
210 network interface
212 receiver metadata
220 processor
230 display output
232 display data
240 head mounted display
250 user
300 required font size function
310 distance to virtual screen in cm
320 font size in pixel
400 original version of visual content
410 adjusted version of visual content
500 virtual environment
510 viewpoint of user
520 virtual canvas showing visual content
522 size of virtual canvas
524 distance to virtual canvas
600 initiate VR share mode
604 request VR share mode
610 sender adjusts content
612 apply fixed window
614 indicate head mounted display capabilities
620 exchange metadata
622 session description
624 show head mounted display view
630 transmit content
640 receive and render content
700 sender side
710 application
712 user input to application
720 screen share orchestrator
722 session information
730 encoder/transmitter
732 encoded media stream(s)
800 receiver side
810 receiver/decoder
820 client orchestrator
822 user input to client orchestrator
824 capabilities, restrictions, user input
830 renderer
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

FIG. 1 shows a first example of screen sharing between a sender system 100 and a receiver system 200. In this example, the sender system 100 may display information on a display 140, e.g., by providing display data 132 to the local display 140. A non-limiting example is that the display 140 may show a graphical user interface of an operating system running on the sender system 100, an application running on the operating system, etc. The sender system 100 may be configured for screen sharing with the receiver system 200. The receiver system 200 may be a VR rendering system, which may also be referred to as 'VR system' or 'VR-based receiver system'. The receiver system 200 may be connected to a head mounted display 240 which may be worn by a user 250, but also to another type of display capable of rendering virtual environments. These type of displays may henceforth also be referred to as 'VR displays'. The receiver system 200 may be configured for rendering a virtual environment which may be displayed by the head mounted display 240, e.g., by the receiver system 200 providing display data 232 to the head mounted display 240.

The following provides a brief description of functionality of the sender system 100 and the receiver system 200 with respect to the screen sharing. Further detailed descriptions will be given with reference to, amongst others, FIGS. 2-11.

At the sender system 100, the screen sharing may involve:
  identifying visual content to be shared with the receiver system 200,
  generating an adjusted version of the visual content which provides improved legibility when viewed in the virtual environment by adjusting a presentation of the visual content based on receiver metadata which is indicative of legibility constraints imposed by the rendering or display of the virtual environment, and
  providing image data 112 representing the adjusted version of the visual content to the receiver system 200.

In the example of FIG. 1, the image data 112 is provided by the sender system 100 to the receiver system 200 via a network 150, such as the Internet.

At the receiver system 200, the screen sharing may involve:
  obtaining, from the sender system 100, the image data 112 representing visual content to be shared by the sender system with the receiver system 200, and
  rendering the image data in the virtual environment, which may comprise projecting the image data onto a virtual canvas in the virtual environment.

FIG. 1 further shows, as optional aspect of the screen sharing, that the system 100 may generate render metadata 114 which may indicate at least in part how the image data 112 is to be rendered in a virtual environment and which may be generated based on legibility constraints imposed by the rendering or display of the virtual environment. The render metadata 114 may be provided by the sender system 100 to the receiver system 200, e.g., via the aforementioned network 150. The receiver system 200 may render the image data 112 in the virtual environment based on the render metadata 114, e.g., taking into account the indication by the sender system 100 of how the image data 112 is to be rendered in the virtual environment.

Yet another optional aspect shown in FIG. 1 is that the receiver metadata, which may provide the sender system 100 with the indication of legibility constraints imposed by the rendering or display of the virtual environment, may be obtained at least in part from the receiver system 200, e.g., as receiver metadata 212 received via the network 150. The receiver metadata 212 may indicate a type of receiver system, e.g. an identifier of a receiver device, and/or one or more characteristics of the rendering or display of the virtual environment by the receiver system 200.

Figure 2:
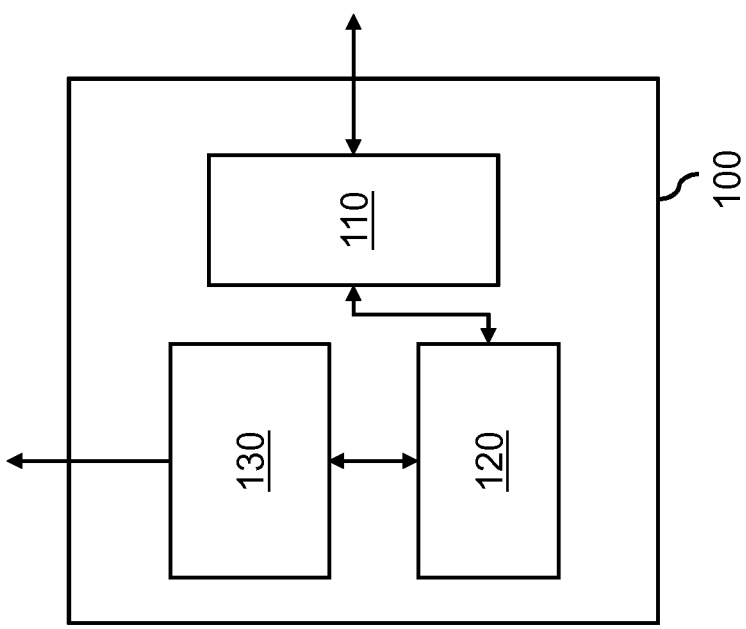
FIG. 2 shows internal components of the sender system.

FIG. 2 shows a more detailed view of the sender system 100. It can be seen that the sender system 100 may comprise a network interface 110 for communicating with the receiver system 200 via one or more networks. The network interface 110 may take any suitable form, including but not limited to a wireless network interface, e.g., based on Wi-Fi, Bluetooth, ZigBee, 4G mobile communication or 5G mobile communication, or a wired network interface based on Ethernet or optical fiber. The network interface 110 may be a local area network (LAN) network interface but also a network interface to a wide area network (WAN), e.g., the Internet.

The sender system 100 may further comprise a processor 120 which may be configured, e.g., by hardware design or software, to perform the operations described with reference to FIG. 1 and others in as far as pertaining to the identifying of the visual content, the generating of the adjusted version of the visual content, and, by using the network interface, the providing of image data representing the adjusted version of the visual content via the network to the receiver system. For example, the processor 120 may be embodied by a single Central Processing Unit (CPU), but also by a combination or system of such CPUs and/or other types of processing units. Although not directly related to the screen sharing itself, FIG. 2 further shows the sender system 100 comprising a display output 130, e.g., to an (external) display.

The sender system 100 may be embodied by a (single) device. For example, the sender system 100 may be embodied as a smartphone, personal computer, laptop, tablet device, gaming console, set-top box, television, monitor, projector, smart watch, smart glasses, media player, media recorder, etc. The sender system 100 may also be embodied by a distributed system of such devices or other entities. An example of the latter may be the functionality of the sender system 100 being distributed over different network elements in a network.

Figure 3:
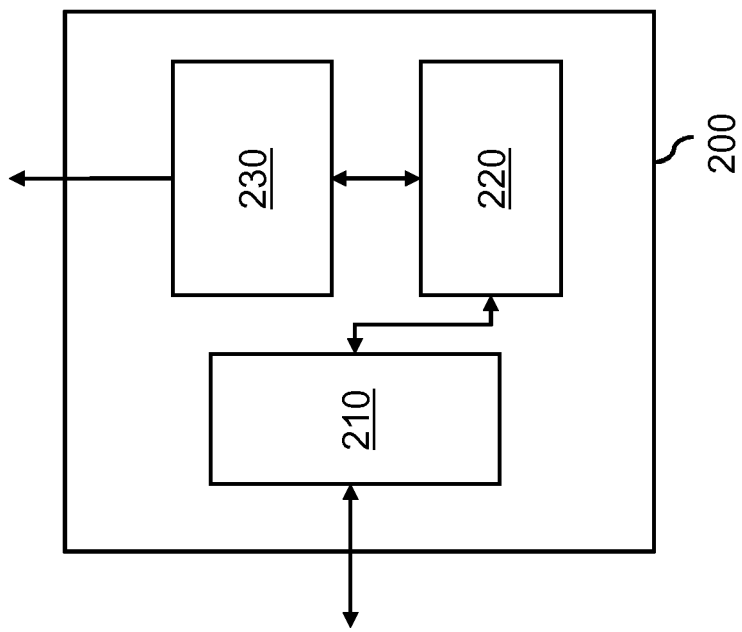
FIG. 3 shows internal components of the VR-based receiver system.

FIG. 3 shows a more detailed view of the receiver system 200. It can be seen that the receiver system 200 may comprise a network interface 210 for receiving data from the sender system 100 via one or more networks, such as the image data and the render metadata as described with reference to FIG. 1. The network interface 210 may also be used for sending data to the sender system 100 via the network(s), such as the receiver metadata as described with reference to FIG. 1. The network interface 210 may take any suitable form, including but not limited to those described with reference to the network interface 110 of the sender system 100 of FIG. 2.

The receiver system 200 may further comprise a processor 220 which may be configured, e.g., by hardware design or software, to perform the operations described with reference to FIG. 1 and others in as far as pertaining to the projecting of the image data onto a virtual canvas in the virtual environment, and the rendering of the virtual environment. In the latter context, the term 'rendering' may refer to generating an image or a video from a geometric description of the virtual environment, but may also include alternative rendering means, including but not limited to the rendering of volumetric video content representing the virtual environment. For example, the processor 220 may be embodied by a single Central Processing Unit (CPU) or a single Graphics Processing Unit (GPU), but also by a combination or system of such CPUs and/or GPUs and/or other types of processing units.

Although not directly related to the screen sharing itself, FIG. 3 further shows the receiver system 200 comprising a display output 230, e.g., to display the rendered virtual environment on a display. The display may be an external display or an internal display, and in general may be head mounted or non-head mounted. Examples of the former include the HTC Vive, Oculus Rift, GearVR and PlayStation VR virtual reality headsets and augmented reality headsets such as Microsoft HoloLens and Google Glass. An example of the latter category is a holographic display or CAVE.

In general, the sender system 100 of FIG. 2 and the receiver system 200 of FIG. 3 may each be embodied as, or in, a device or apparatus. The device or apparatus may comprise one or more (micro)processors which execute appropriate software. The processors of either system may be embodied by one or more of these (micro)processors. Software implementing the functionality of either system may have been downloaded and/or stored in a corresponding memory or memories, e.g., in volatile memory such as RAM or in non-volatile memory such as Flash. Alternatively, the processors of either system may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of either system may be implemented in the form of a circuit. It is noted that either system may also be implemented in a distributed manner, e.g., involving different devices.

The following illustrates why the legibility of visual content may be impaired when the visual content is projected onto a virtual canvas in a virtual environment which is then rendered and displayed on a head mounted display. Here, the virtual canvas is, by way of example, a virtual screen, also referred to as virtual display.

When collaboration is based on, for example, a shared document editor such as Google Docs or Microsoft Office 365, users may configure their viewing environment (e.g., layout and positioning of user interface components, size of text, etc.) so that the information shared in the document editor is sufficiently legible. However, this may not be possible when such collaboration is based on screen sharing which involves the sharing of image data. Namely, if the visual content shown on a desktop monitor or similar type of physical screen is displayed on a virtual screen at the same size at the same distance as the physical screen, this would provide a much lower (physical) resolution for the virtual screen than for the physical screen.

For example, if the desktop monitor is a 24 inch screen with 1920×1200 resolution positioned at a distance of 60 cm and text is shown with no zoom (e.g. 100% zoom level), then a single A4 paper uses 1103×780 pixels. Using normal font sizes, e.g. 8 pt-12 pt, this will result in small but readable text for most people. A virtual screen of the same size at the same distance showing the same A4 paper at the same zoom level on a selected type of head mounted display, e.g., an Oculus CV1, would for the same A4 paper use only 340×222 pixels per eye. Here, it is assumed that the Oculus CV1 uses a Field of View (FoV) of 94° in the horizontal direction and 93° in the vertical direction, and that it provides a resolution of 1080×1200 per eye. At the same normal font sizes, text would not be readable at all. Similar problems occur with other types of head mounted displays, as well as other types of VR displays.

It may be possible to solely adjust properties of the virtual screen to ensure readability of the text, such as the screen size, the distance and/or the orientation of the virtual screen with respect to a viewpoint of the viewer in the virtual environment. However, when for example the screen size is adjusted, the virtual screen would need to be approximately three times as large at the same distance, e.g., a 72 inch screen, which at a distance of 60 cm would block almost the entire FoV of the viewer and thus leave little space to show surrounding parts of the virtual environment to the user.

Figure 4:
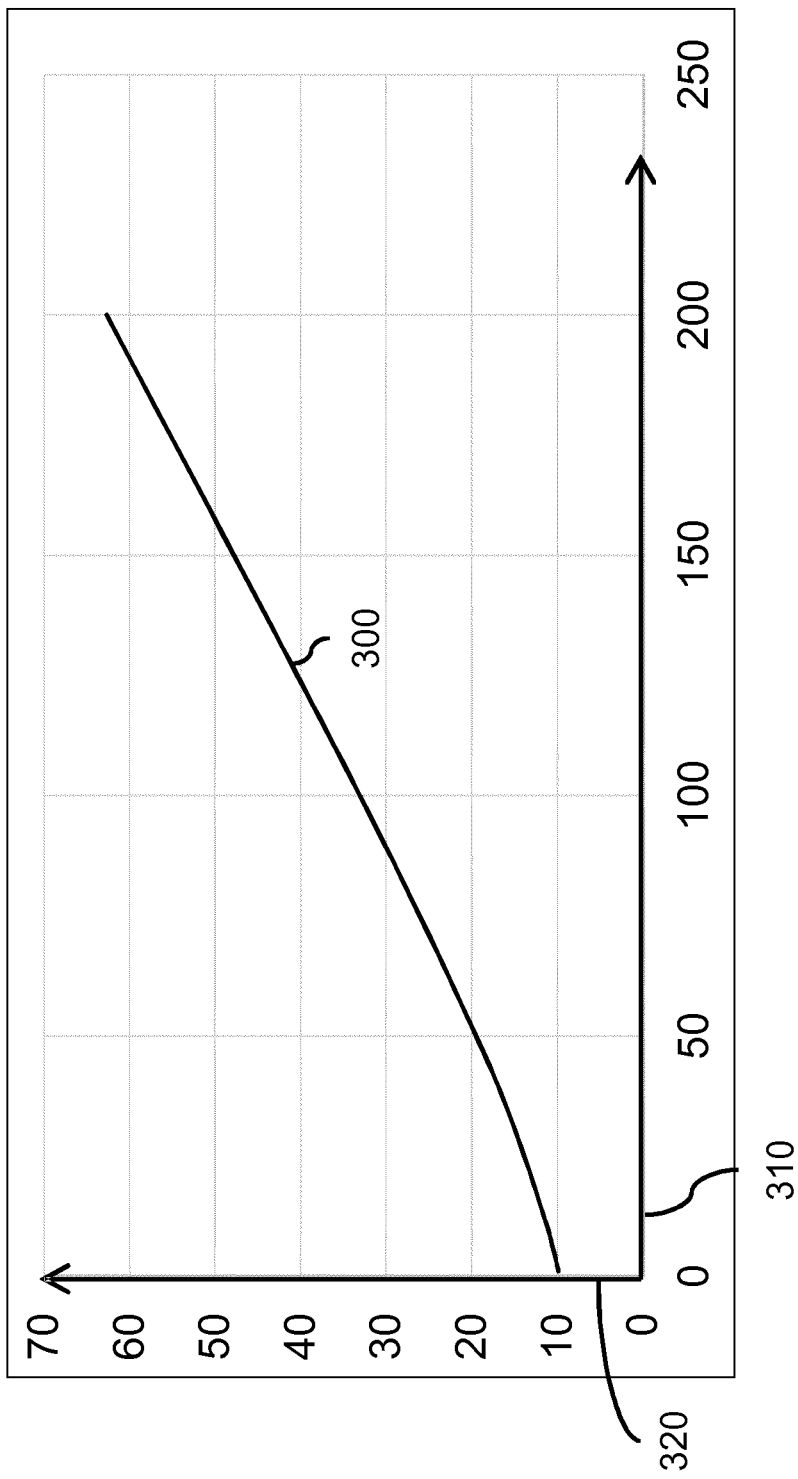
FIG. 4 illustrates text readability on a selected type of head mounted display by showing which font size is needed when showing text on a virtual screen in a virtual environment to obtain a same readability as an 8-pixel font on a regular display.

FIG. 4 further illustrates text readability on the Oculus CV1 by showing, using an experimentally derived function 300, which font size (in pixels along the vertical axis 320) may be needed as a function of the distance to the virtual screen (in cm along the horizontal axis 310) when showing text on a virtual screen in a virtual environment to obtain a same readability as an 8-pixel font on a regular screen, with both the regular screen and the virtual screen using 100% scaling and being 1 m wide.

The font size r which may be needed on a virtual screen may also be calculated using trigonometry, for example as follows:

$$r(o, w, d, f) = \frac{f \cdot o}{\tan^{-1}\frac{w}{2d}} \cdot \frac{\pi}{360°}$$

Here, o is the original font size in points (a typography unit of length, symbol pt), w the width of the screen in meters, d the distance to the virtual screen in meters, and f the field-of-view of the headset or other VR display in degrees. For example, given a text with font size 14 on a screen of 1 m wide, at a distance of 2 m, viewed on a headset with a field-of-view of 110 degrees, the formula predicts that the font size on the virtual screen to match a font of size 14 on a regular screen equals:

$$r(14, 1, 2, 110) = \frac{110° \cdot 14 \text{ pt}}{\tan^{-1}\frac{1 \text{ m}}{4 \text{ m}}} \cdot \frac{\pi}{360°} \approx 54.86 \text{ pt} \approx 55 \text{ pt}$$

Figure 5:
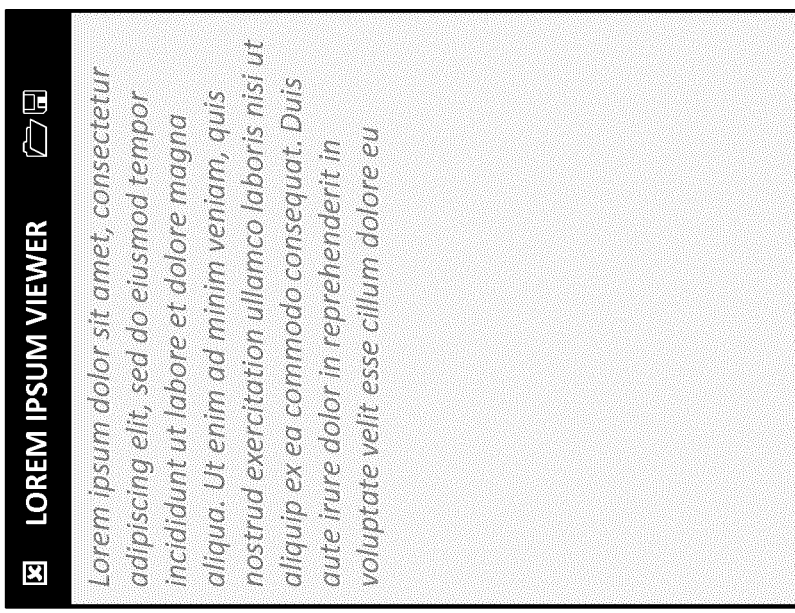
FIG. 5 shows visual content to be shared with the receiver system.

FIG. 5 shows an example of visual content 400 which may be shared by the sender system with the receiver system, and of which the presentation may be adjusted by the sender system. In this example, the visual content 400 is text shown by an application. In general, the visual content may be any type of content which represents information of which the legibility may be impaired when rendered and displayed as part of a virtual environment on a VR display, including but not limited to text, tables, vector graphics, raster graphics, etc., or a combination thereof.

Figure 6:
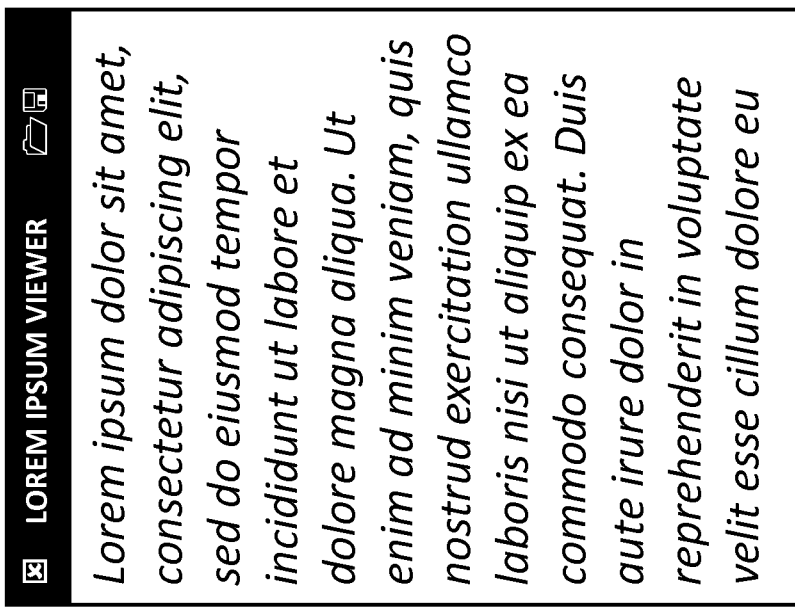
FIG. 6 shows an adjusted version of the visual content which provides improved legibility when rendered by the receiver system in a virtual environment.

FIG. 6 shows an adjusted version of the visual content 410 which provides improved legibility when rendered and displayed as part of the virtual environment on a VR display. Namely, in this example, the contrast of the text is improved as the text color (black) contrasts more with the background color (white), while the font size of the text is increased significantly compared to the original version of the visual content 400.

Depending on the type of visual content and the type of legibility constraints imposed by the rendering and displaying of the virtual environment on a VR display, the presentation of the visual content may be adjusted in various ways, including but not limited to increasing or decreasing a font size of text in the visual content, increasing or decreasing a zoom level in the presentation of the visual content, adjusting a color scheme in the presentation of the visual content, increasing or decreasing a contrast of at least part of the visual content, and re-formatting the visual content for a display having a lower or higher pixels-per-inch setting and/or size than the display for which the visual content was formatted. It is noted that increasing of font size/zoom level/contrast/etc. may facilitate legibility but in some cases also the decreasing of font size/zoom level/contrast/etc. In an example where the visual content is text, if the virtual canvas is relatively small or far away, the font size may be increased to improve legibility. Another example of where increasing the font size may improve legibility is one where the virtual canvas is relatively large but the original font size (e.g., of the original version of the visual content) is too small to be legible. However, if the virtual canvas is small and the original font size is very large, this may also impair legibility of the text since the virtual canvas fits very little of the text. Accordingly, the font size may be decreased to improve the legibility of the text. Similarly, if both the virtual canvas and the font size are very large, this may also impair legibility of the text. Also here, the font size may be decreased to improve legibility.

Also the layout of the visual content may be adjusted, which may involve use of techniques which correspond to or are at least conceptually similar to 'responsive web design', by which webpages are not statically defined but rather allow a browser to dynamically determine the optimal layout based on display parameters such as the type of viewing device, the screen size, the screen resolution, the size of the browser's window, etc. Similar and further examples of such adjustments will be described with reference to FIG. 11.

The presentation may be adjusted based on receiver metadata which is indicative of legibility constraints imposed by the rendering or display of the virtual environment. The receiver metadata may, for example, indicate that the receiver system is a VR system. The receiver metadata may also indicate one or more characteristics of the rendering or display of the virtual environment by the receiver system. For example, the receiver metadata may indicate a type of display on which the virtual environment is displayed, e.g., by means of a type identifier, a resolution of the display, a size of the virtual canvas in the virtual environment, and/or a distance of the virtual canvas with respect to a viewpoint of a viewer in the virtual environment. Another example is that the type of lens used in a head mounted display may be indicated, as the type of lens may also affect the legibility of the visual content. Yet another example is that the supported color space of the display of the receiver system may effect the legibility of the visual content, e.g., if the color gamut of the display is small, colors outside of that gamut may be incorrectly rendered and/or clipped. Yet another example is that visually impairing factors in the virtual environment may be signaled, such as the presence of smoke or fog or a limited rendering distance, etc.

It will be appreciated that the receiver metadata may be obtained at least in part from the receiver system itself, e.g., as previously described with reference to FIG. 1. In this case, the receiver system may also report information such as networking conditions, processing power, decoding capabilities, etc., which may be used by the sender system to optimally generate the image data or optimally encode the image data. Another example is that the receiver metadata may be internal data stored in the sender system describing how the presentation of visual content may be adjusted for a general type of VR system. Yet another example is that the receiver metadata may be obtained from an internal or external database based on a type identifier of the VR system. For example, the VR system may provide the type identifier to the sender system during a communication session, which may enable the sender system to query the database for the receiver metadata based on the provided type identifier.

FIG. 7 illustrates the rendering of the adjusted visual content on a virtual canvas in a virtual environment in relation to a viewpoint of a viewer. Here, the virtual environment 500 is shown illustratively as a circular shape, e.g., a ball or a circle, but may appear to the viewer of the virtual environment 100 to have any other size and/or shape. In the virtual environment, a viewpoint 510 of a viewer 250 is shown, which may be represented in the virtual environment by a virtual camera or, in case of a stereoscopic VR display, a pair of virtual cameras. The virtual canvas 520 is shown to have a size 522 in the virtual environment (here shown only along one axis, but may be a two- or three-dimensional size) and a distance 524 to the viewer's viewpoint 510.

The size 522, distance 524 and/or orientation of the virtual canvas (e.g., as specified by a 3D rotation) may be suggested or prescribed by the sender system. Namely, based on the legibility constraints indicated by the receiver metadata, the sender system may generate render metadata which indicates at least in part how the image data is to be rendered in the virtual environment. It is noted that with the distance and orientation, a relative position of the virtual canvas may be suggested or prescribed relative to the viewer's viewpoint. The render metadata may then be provided to the receiver system, e.g., together with the image data or separately therefrom. An example of the former is that the render metadata may be multiplexed with the image data to form a media stream. The render metadata may suggest or prescribe various aspects of how the image data is to be rendered in the virtual environment, such as the size of the virtual canvas in the virtual environment and/or the distance and/or the orientation of the virtual canvas with respect to a viewpoint of a viewer in the virtual environment. Another example is that the render metadata may suggest or prescribe a processing to be applied by the receiver system to the image data, such as a contrast or color adjustment. Similar and further examples of such rendering and/or display parameters will be described with reference to FIG. 11.

Figure 8:
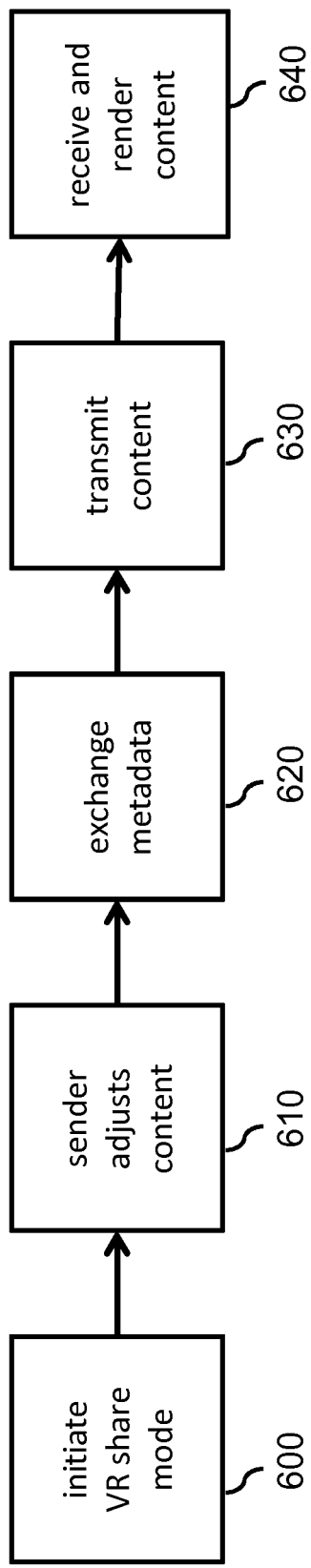
FIG. 8 shows steps of a general screen sharing example.
Figure 9:
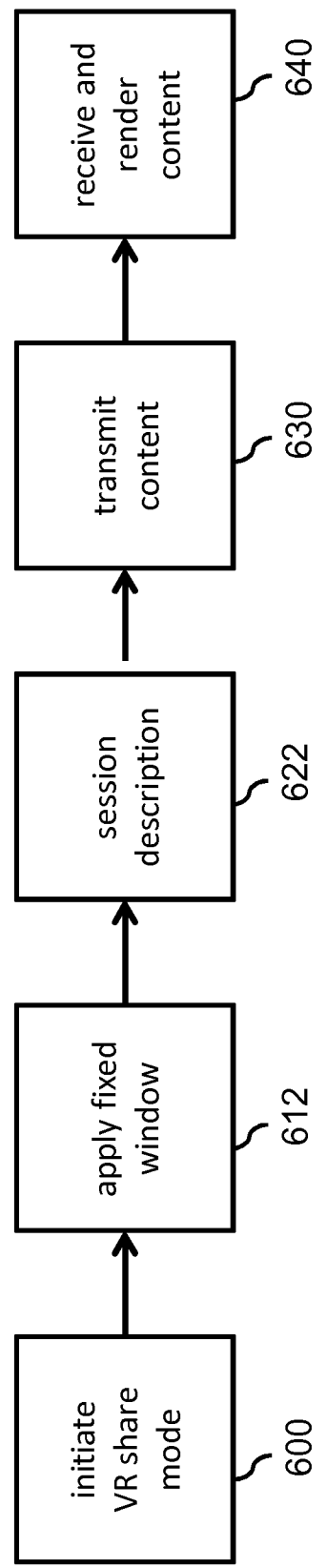
FIG. 9 shows steps of a sender-oriented screen sharing example.
Figure 10:
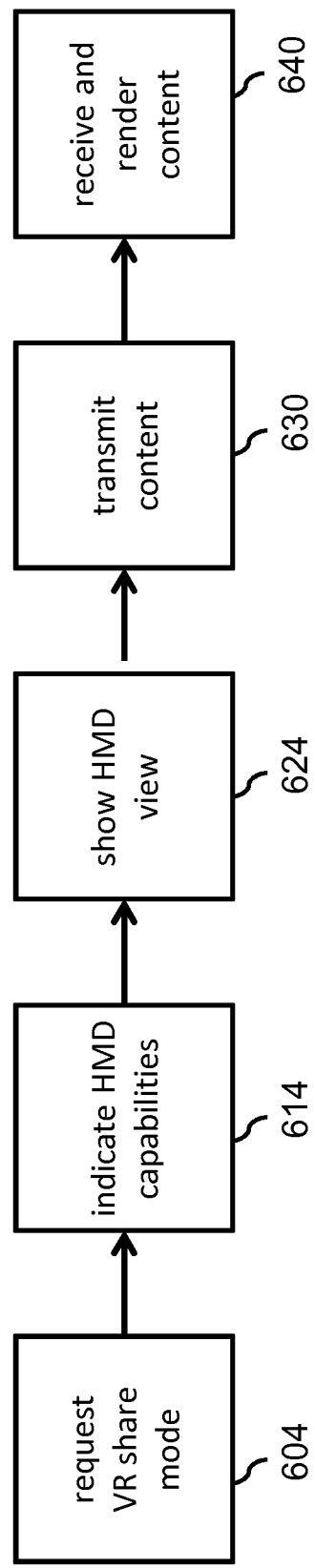
FIG. 10 shows steps of a receiver-oriented screen sharing example.

FIG. 8 shows steps of a general screen sharing example which serves as a basis for the specific examples of FIG. 9 and FIG. 10. In this general example, in a first step 600, a screen sharing is initiated, which may be by the sender system itself, e.g., at the request of a user or autonomously, but also by the receiver system. Subsequently, in a second step 610, the sender system adjusts the visual content as previously described, in a third step 620 metadata is exchanged which may involve the sender system receiving receiver metadata from the receiver system, in a fourth step 630 the adjusted visual content is transmitted to the receiver system and in a fifth step 640 the adjusted visual content is received and rendered by the receiver system. It is noted that at least the third step 620 and fourth step 630 may also be performed in a different (reverse) order, or simultaneously, or in a time-overlapping manner.

FIG. 9 illustrates a sender-oriented screen sharing example. In this example, reference is made to a 'non-VR' user referring to the user of the sender system, and to a 'VR user' referring to the user of the receiver system. The non-VR user may decide to share visual content by selecting, e.g., in a software application which embodies the claimed screen sharing functionality, a "VR sharing mode" for sharing a Microsoft Word document. This action may represent the first step 600 by which the VR share mode is initiated. In response, in a second step 612, a fixed limited window size may be applied to the window of the Microsoft Word document as a way to adjust the sender's screen content, while maintaining or even increasing the font size. For example, the window size may be adjusted to 640×480 pixels. As a result, the non-VR user may have limited screen real-estate for the Microsoft Word window, and perhaps cannot resize the window anymore. However, relative to the reduced window size, the font size may now appear larger. In a third step 622, render metadata may be provided by the sender system to the receiver system in the form of a session description which may describe the way the receiver system should render the received adjusted visual content in the virtual environment. As was the case in the example of FIG. 8, in a fourth step 630, the adjusted visual content may be transmitted to the receiver system and in a fifth step 640 the adjusted visual content may be received and rendered by the receiver system. The rendering at the receiver system may be based on the session description.

In general, a session description, being an example of render metadata, may be exchanged using SDP (Session Description Protocol) or using a XML scheme, e.g., as or in a similar way to a Media Presentation Description (MPD).

The following provides an example of such a session description using SDP, which recommends to render the adjusted visual content at a distance of 1 m with a width of 60 cm, and which uses a SDP media level attribute defined as a=vr-share <distance> <window_width> used in conjunction with the SDP image attribute.

a=imageattr:97 send [x=640, y=480, sar=1.34]
a=vr-share 100 60

The following provides an example of a session description in XML, which is not fully complete but rather focuses on the screen sharing aspects. Here, the description is in an MPD-like format, with an added role defined as 'sharedScreen' and added supplemental properties 'shared version' to indicate a VR version, 'shared VR distance' being a distance in cm, and 'shared VR screen width' being a width in cm.

```
<AdaptationSet mimeType="video/mp4" width="1024" height="768" sar="4:3">
    <Role schemeIdUri="urn:mpeg:dash:role:2017" value="sharedScreen"/>
    <Representation id="1">
        <SupplementalProperty schemeIdUri="urn:mpeg:dash:shared_version:2017" value="VR"/>
        <SupplementalProperty schemeIdUri="urn:mpeg:dash:sharedVR:distance:2017" value="100">
        <SupplementalProperty schemeIdUri="urn:mpeg:dash:sharedVR:screen_width:2017" value="60">
    </Representation >
</AdaptationSet>
```

FIG. 10 shows steps of a receiver-oriented screen sharing example. In this example, the receiver system may assume a more active role, in that it may, in a step 604, request VR-specific screen sharing to be initiated by the sender system. For that purpose, the receiver system may, in a second step 614, indicate its VR display capabilities to the sender system, such as the type of display and the display resolution. In addition, virtual display size and virtual display placement may be indicated to the sender system. In general, such data may be provided to the sender system in the form of receiver metadata. In this example, the VR user may be enabled to scroll through the shared visual content on the virtual display using, e.g., VR controllers or hand gesture detection e.g., using a leap motion controller. The non-VR user may be shown, in a third step 624, a visual box indicating the current view of the VR user, e.g., by means of a box-shaped outline. This feedback may allow the non-VR user to place different visual content in the visual box and thereby share different visual content with the VR user.

Additionally or alternatively, the VR user may, by means of scrolling, move the visual box across the screen of the non-VR user and thereby view different parts of the screen, e.g., on the basis of the previously described fourth step 630 and fifth step 640. Effectively, the screen sharing may share a specific region of interest rather than, e.g., the entire screen. Regions of interest may be signaled using existing methods, such as, e.g., those specified in MPEG-MORE.

In this example, the receiver system may first set-up the virtual environment with a virtual screen having a specific size, e.g., 80 cm width and 16:9 aspect ratio, and place the virtual screen at a specific distance from the user, e.g., 80 cm, in the virtual environment. Together with the resolution of the VR display, e.g., 2160×1200 pixels, this allows the sender system to determine the appropriate size of its shared content.

The receiver system may indicate its capabilities to the sender system in the form of receiver metadata, which may be provided in a same or a similar type of format as previously described with reference to FIG. 9 for the session description.

For example, an SDP attribute may be defined for a terminal type, which may include the type of VR display and the resolution of the VR display, and a second SDP attribute for the virtual screen, which may be defined as a=virtualscreen <distance> <screensize>, with distance and screen size defined in cm. During session setup between sender and receiver, the terminal type may be sent as a session level attribute and the virtual screen as a media level attribute for the screen share.
a=terminaltype:HMD recv [x=2160, y=1200]
a=virtualscreen 80 [x=80, y=45]

The same parameters may also be sent in an XML scheme, e.g., based on MPEG-21, which may in this example be extended with a virtual screen size and screen distance. Moreover, in this example, a type identifier of the type of VR display may be used to indicate that an HMD is used. As in the example of FIG. 9, this XML scheme is not fully complete but rather focuses on the screen sharing aspects.

```
<Terminal>
  <TerminalCapability xsi:type="DisplaysType">
    <Display id="HMD">
      <DisplayCapability xsi:type="DisplayCapabilityType">
        <Mode>
          <Resolution horizontal="2160" vertical="1200"/>
          <VirtualScreenSize horizontal="800" vertical="450" />
          <VirtualScreenDistance value="800" />
        </Mode>
      </DisplayCapability>
    </Display>
  </TerminalCapability>
</Terminal>
```

Based on the receiver metadata, the sender system may determine the screen area, or in general the size of the visual content to be shared, which will fit this virtual screen and still provide sufficient legibility. In addition, the sender system may select the appropriate resolution and encoding method, e.g., for the media stream.

Figure 11:
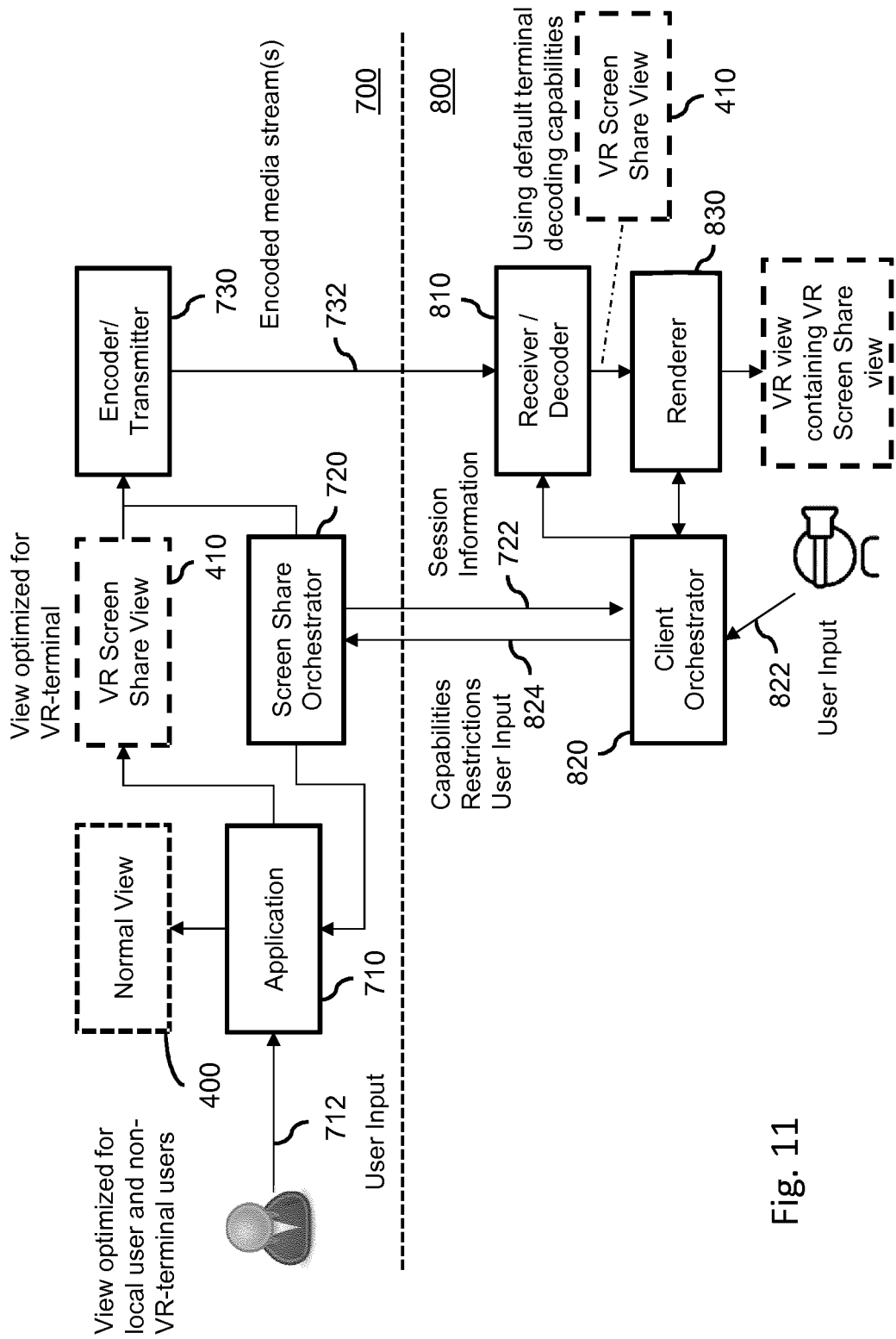
FIG. 11 shows a system architecture of a screen sharing embodiment.

FIG. 11 shows a system architecture of a screen sharing embodiment, which, similarly to the example of FIG. 10, is receiver oriented in that it allows a VR user to receive and interact with shared content optimized for the VR system. The functional components of the system architecture are described in the following. Here, the functionality of the Application 710, Screen Share Orchestrator 720 and Encoder/Transmitter 730 may be carried out by the sender system, e.g., by one or more CPUs or other types of processing units of the sender system, which may, for the Transmitter 730, involve use of a network interface. Likewise, the functionality of the Receiver/Decoder 810, the Client Orchestrator 820 and the Renderer 830 may be carried out by the receiver system. For example, the functionality of the Receiver/Decoder 810 and the Client Orchestrator 820 may be carried out by one or more CPUs or other types of processing units of the receiver system, which may, for the Receiver 810, involve use of a network interface, whereas the functionality of the Renderer 830 may be carried out by one or more GPUs of the receiver system.

The screen sharing may allow a view of an Application 710 to be shared with a VR user. The view may represent visual output of the Application 710. The default view ("Normal View") may thus comprise visual content 400 optimized for the non-VR user. A separate view of the Application 710 may be generated ("VR Screen Share View") which comprises visual content 410 adjusted for the VR user.

The Screen Share Orchestrator 720 may create the VR Screen Share View based on the Capabilities, Restrictions and User Input 824, which may be provided by the Client Orchestrator 820, e.g., in the form of (receiver) metadata. The VR Screen Share View may then be encoded and transmitted to the receiver system via the Encoder/Transmitter 730 and a network (not shown explicitly in FIG. 11). The Screen Share Orchestrator 720 may also indicate in the Normal View what the VR Screen Share View consists of, e.g., what part of the Normal View is covered by the VR Screen Share View. The non-VR user may provide User Input 712 to the Application 710 or to the Screen Share Orchestrator 720 to adjust the VR Screen Share View.

The Client Orchestrator 820 may communicate with the Screen Share Orchestrator 720, e.g., via the network, to setup the Screen Share session. Such communication may take place before and typically also during the session. For example, the Client Orchestrator 820 may provide, in the form of receiver metadata, capabilities and restrictions of the receiver system and/or its display (e.g., resolution, framerate, pixel density, viewport, supported streaming protocols), the network (e.g., available bandwidth, latency, jitter), user input commands (e.g., pan, zoom, change view, ask for control, etc.). The Client Orchestrator 820 may further receive the Session Information 722, e.g., in SDP format, so as to allow it to establish the streaming session between the Encoder/Transmitter 730 and the Receiver/Decoder 810.

The sender system may have a Receiver/Decoder 810 which receives the encoded media stream(s) and provides the decoded stream(s), e.g., the VR Screen Share View, to the Renderer 830. The Renderer 830 may be (part of) a VR application which renders the VR Screen Share View in the VR environment, based on User Input, Session Information and other info relevant to the VR application (not shown). The result is output in the form of a VR View containing the VR Screen Share View.

It will be appreciated that the Client Orchestrator 820 may be part of the receiver system, part of the VR application which will show the screen share but may also be a network element in a network between the sender system and the receiver system. The Screen Share Orchestrator 720, Application 710 and Encoder/Transmitter 730 may be part of a local device but may also be embodied completely or partially in the network. For example, a Screen Share Renderer, which may otherwise be part of the Application 710, may be cloud-based and may thus create the VR Screen Share View without utilizing resources such as the CPU, GPU or memory of the sender system. Moreover, although not shown explicitly in FIG. 11, the VR view containing the VR Screen Share View may also be transmitted to the sender system to provide the non-VR user with feedback about what the VR user is seeing, e.g., with his/her VR headset. Alternatively, the sender system may locally indicate or 'simulate' to the non-VR user what the VR user is seeing. An example of the former is placing a bounding box around the shared visual content. An example of the latter is simulating the rendering and display of the (adjusted version of) the visual content on a virtual screen.

With further reference to the Client Orchestrator 820: the Client Orchestrator may signal the capabilities and restrictions of the receiver system in the form of receiver metadata, or the Screen Share Orchestrator 720 may infer this information, e.g., from a type identifier, serial number or other identification of the receiver system. Such capabilities and restrictions may include, but are not limited to, the field of view of a head mounted display, the dimensions of the virtual screen inside the virtual environment, the virtual distance to this virtual screen, the maximal virtual screen size that is useful for the VR user, such that the receiver system does not need to up/downscale the view and the view fits in the user's viewport, the decoding capabilities of the receiver system, the supported resolution of the display and the VR application, the available network resources for transmitting the screen share, etc.

The Screen Share Orchestrator 720 may determine the most likely part(s) of the Application 710 the VR user is interested in, e.g., a region of interest. A first example is that this may be done by making use of so-called semantic elements. For example, with web pages, the Screen Share Orchestrator 720 may use the semantic elements of a web page to determine which parts to focus on (e.g., section, article) or omit (e.g., footer). Such techniques are known per se. For a text editing application, the region of interest may be the main window. The non-VR user may also highlight which window or part of a window is to be shared. The Screen Share Orchestrator 720 may then generate and/or update the VR Screen Share View by adjusting the visual content of the area which is shared, e.g., by changing a font-size to an appropriate size for the VR user, changing a color scheme, changing user interface elements to accommodate the size of the virtual screen, changing a Pixels Per Inch (PPI) setting, using different/optimal layouts. Other types of adjustments may include changing the area that is being shared, e.g., by resizing the shared area such that, e.g., a larger or smaller area of a source window is covered, scaling the visual content covered by the shared area, e.g., by changing the size of the underlying source window, or changing the resolution of the shared area, e.g., capturing the shared area at 400×300 pixels or 800×600 pixels.

The screen sharing functionality as described in this specification may also be applied to the sharing of visual content between two VR systems, e.g., with the receiver VR system having legibility constraints over the sender VR system, such as a lower display resolution, and the sender VR system generating an adjusted version of the visual content to be shared which is better legible on the receiver VR system.

While sharing the adjusted visual content with a receiver VR system, the visual content may also be shared with other non-VR systems, adjusted or not.

The visual content may be adjusted by the sender system on the basis of a user profile. For example, the user profile may indicate which font size is still legible for the user, e.g., given a certain display resolution and virtual screen placement.

Normally, the sender system may adapt the visual content before transmission. However, it may be that the visual content is already sufficiently legible for the VR user, e.g., by the non-VR user having already limited the window size. The suitability of the visual content for sharing with the receiver system may thus first be verified before it is decided by the sender system to adjust the visual content.

In addition to the size and dimensions of the virtual screen, it may also be taken into account by the sender system if the virtual screen is rotated and/or tilted with respect to the VR viewer since this may further impair the legibility of the visual content, e.g., by limiting the number of pixels available for the virtual screen. Such rotation/tilting may be signaled to the sender system, e.g., as part of the receiver metadata.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium, e.g., in the form of a series of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. The computer readable medium may alternatively or additionally comprise transitory or non-transitory data representing the render metadata and/or the receiver metadata as described in this specification.

Figure 12:
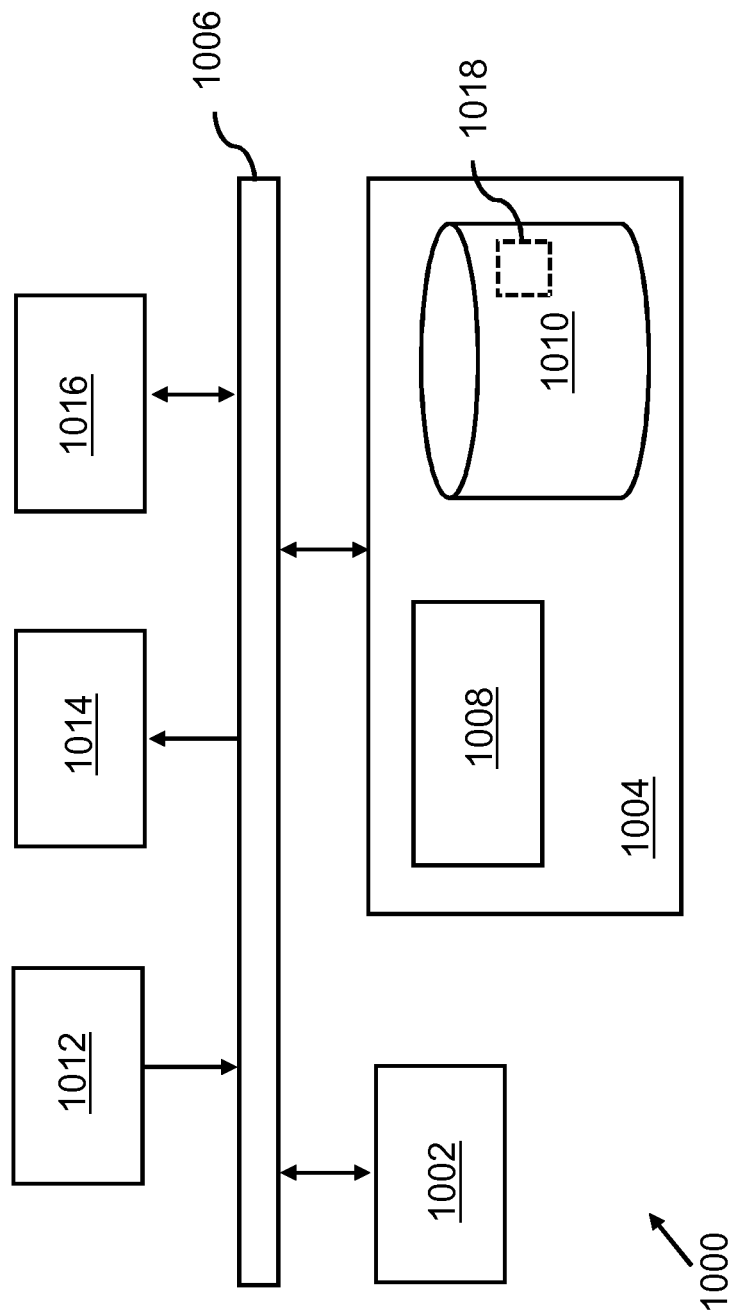
FIG. 12 shows an exemplary data processing system.

FIG. 12 is a block diagram illustrating an exemplary data processing system that may be used in the embodiments described in this specification. Such data processing systems include data processing entities described in this specification, including but not limited to the sender system and the receiver system.

The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 12, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may represent the sender system. In that case, application 1018 may represent an application that, when executed, configures data processing system 1000 to perform the functions described herein with reference to the sender system. In another aspect, data processing system 1000 may represent the receiver system. In that case, application 1018 may represent an application that, when executed, configures data processing system 1000 to perform the functions described herein with reference to the receiver system.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of providing image data from a sender system to a receiver system for screen sharing, wherein the receiver system is a Virtual Reality [VR] system configured to render the image data in a virtual environment by projecting the image data onto a virtual canvas, the method comprising, at the sender system:
    identifying visual content to be shared with the receiver system;
    generating an adjusted version of the visual content which provides improved legibility when viewed in the virtual environment by adjusting a presentation of the visual content based on receiver metadata which is indicative of legibility constraints imposed by the rendering or display of the virtual environment; and
    providing image data representing the adjusted version of the visual content to the receiver system;
    based on the legibility constraints indicated by the receiver metadata, generating render metadata which indicates at least in part how the image data is to be rendered in the virtual environment; and
    providing the render metadata to the receiver system, wherein the render metadata indicates at least one of:
    a size of the virtual canvas in the virtual environment; and
    a distance and/or orientation of the virtual canvas with respect to a viewpoint of a viewer in the virtual environment.

2. The method according to claim 1, further comprising obtaining the receiver metadata from the receiver system, wherein the receiver metadata indicates one or more characteristics of the rendering or display of the virtual environment by the receiver system.

3. The method according to claim 2, wherein the one or more characteristics comprise at least one of:
    a type of display on which the virtual environment is displayed;
    a resolution of the display;
    a field of view of the display;
    a type of lens used by the display;
    a color space used by the display;
    a size of the virtual canvas in the virtual environment; and
    a distance and/or orientation of the virtual canvas with respect to a viewpoint of a viewer in the virtual environment.

4. The method according to claim 1, wherein the adjusting of the presentation of the visual content comprises at least one of:
    adjusting a font size of text in the visual content;
    adjusting a zoom level in the presentation of the visual content;
    adjusting a color scheme in the presentation of the visual content;
    adjusting a contrast of at least part of the visual content; and
    re-formatting the visual content for a display having a different pixels-per-inch setting and/or size than the display for which the visual content was formatted.

5. The method according to claim 1, wherein generating the adjusted version of the visual content comprises:
    adjusting a current presentation of the visual content which is currently displayed by the sender system on a display; or
    generating the adjusted version of the visual content separately from the current presentation of the visual content.

6. A non-transitory computer-readable medium comprising a computer program, the computer program comprising instructions for causing a processor system to perform the method according to claim 1.

7. A method of rendering image data provided by a sender system to a receiver system for screen sharing, wherein the receiver system is a Virtual Reality [VR] system, the method comprising, at the VR system:
    obtaining, from the sender system:
    image data representing visual content to be shared by the sender system with the receiver system, and
    render metadata which indicates at least in part how the image data is to be rendered in a virtual environment by projecting the image data onto a virtual canvas and which is generated based on legibility constraints imposed by the rendering or display of the virtual environment, wherein the render metadata indicates at least one of:
a size of the virtual canvas in the virtual environment; and
a distance and/or orientation of the virtual canvas with respect to a viewpoint of a viewer in the virtual environment; and
rendering the image data in the virtual environment based on the render metadata, wherein said rendering comprises projecting the image data onto the virtual canvas in the virtual environment.

8. The method according to claim 7, further comprising providing receiver metadata to the sender system, wherein the receiver metadata is indicative of the legibility constraints imposed by the rendering or display of the virtual environment.

9. A non-transitory computer-readable medium comprising:
render metadata which indicates at least in part how the image data is to be rendered in a virtual environment, by projecting the image data onto a virtual canvas and which is generated based on legibility constraints imposed by a rendering or display of the virtual environment, wherein the render metadata indicates at least one of:
a size of the virtual canvas in the virtual environment; and
a distance and/or orientation of the virtual canvas with respect to a viewpoint of a viewer in the virtual environment.

10. A sender system configured for providing image data to a receiver system for screen sharing, wherein the receiver system is a Virtual Reality [VR] system configured to render the image data in a virtual environment by projecting the image data onto a virtual canvas, wherein the sender system comprises:
a network interface to a network;
a processor configured to:
identify visual content to be shared with the receiver system;
generate an adjusted version of the visual content which provides improved legibility when viewed in the virtual environment by adjusting a presentation of the visual content based on receiver metadata which is indicative of legibility constraints imposed by the rendering or display of the virtual environment;
based on the legibility constraints indicated by the receiver metadata, generate render metadata which indicates at least in part how the image data is to be rendered in the virtual environment;
using the network interface, provide image data representing the adjusted version of the visual content via the network to the receiver system; and
using the network interface, provide the render metadata via the network to the receiver system, wherein the render metadata indicates at least one of:
a size of the virtual canvas in the virtual environment; and
a distance and/or orientation of the virtual canvas with respect to a viewpoint of a viewer in the virtual environment.

11. A receiver system configured for rendering image data provided by a sender system to the receiver system for screen sharing, wherein the receiver system is a Virtual Reality [VR] system, wherein the VR system comprises:
a network interface to a network for obtaining, from the sender system:
image data representing visual content to be shared by the sender system with the receiver system, and
render metadata which indicates at least in part how the image data is to be rendered in a virtual environment by projecting the image data onto a virtual canvas and which is generated based on legibility constraints imposed by the rendering or display of the virtual environment, wherein the render metadata indicates at least one of:
a size of a virtual canvas in the virtual environment; and
a distance and/or orientation of the virtual canvas with respect to a viewpoint of a viewer in the virtual environment; and
a processor configured to render the image data in the virtual environment based on the render metadata, wherein said rendering comprises projecting the image data onto the virtual canvas in the virtual environment.

12. The receiver system according to claim 11, wherein the processor is configured to provide receiver metadata to the sender system using the network interface, wherein the receiver metadata is indicative of the legibility constraints imposed by the rendering or display of the virtual environment.

* * * * *